United States Patent [19]

Takeishi

[11] Patent Number: 5,625,310
[45] Date of Patent: Apr. 29, 1997

[54] SIGNAL PROCESSING APPARATUS AND DISPLACEMENT DETECTING APPARATUS USING THE SAME

[75] Inventor: Hiroaki Takeishi, Utsunomiya, Japan

[73] Assignee: Canon Kabushiki Kaisha, Tokyo, Japan

[21] Appl. No.: 390,563

[22] Filed: Feb. 17, 1995

[30] Foreign Application Priority Data

Feb. 18, 1994 [JP] Japan ................................ 6-21065

[51] Int. Cl.⁶ ............................ H03K 3/286; G05B 1/02
[52] U.S. Cl. ...................... 327/233; 327/3; 327/141; 327/603; 318/592; 318/594; 318/603; 318/618
[58] Field of Search ...................... 327/231, 232, 327/233, 141, 162, 163, 3, 12; 364/550, 577; 341/110, 115, 116; 318/592, 594, 600; 377/17

[56] References Cited

U.S. PATENT DOCUMENTS

| | | | |
|---|---|---|---|
| 3,976,997 | 8/1976 | Hafle | 340/347 |
| 4,225,931 | 9/1980 | Schwefel | 364/577 |
| 4,462,083 | 7/1984 | Schwefel | 364/577 |
| 4,905,101 | 2/1990 | Ohta et al. | 360/36.2 |
| 4,912,661 | 3/1990 | Potter | 364/550 |
| 4,922,175 | 5/1990 | Sugiura et al. | 318/592 |
| 4,970,511 | 11/1990 | Mills | 341/13 |
| 5,079,549 | 1/1992 | Liessner | 341/116 |
| 5,121,116 | 6/1992 | Taniguchi | 341/116 |
| 5,260,669 | 11/1993 | Higgins et al. | 327/231 |

FOREIGN PATENT DOCUMENTS

| | | |
|---|---|---|
| 0379589 | 8/1990 | European Pat. Off. . |
| 0414953 | 3/1991 | European Pat. Off. . |
| 0643285 | 3/1995 | European Pat. Off. . |
| 54-019773 | 2/1979 | Japan . |
| 2086039 | 5/1982 | United Kingdom . |
| 2156977 | 10/1985 | United Kingdom . |

Primary Examiner—Timothy P. Callahan
Assistant Examiner—Kenneth B. Wells
Attorney, Agent, or Firm—Fitzpatrick, Cella, Harper & Scinto

[57] ABSTRACT

A signal processing apparatus is provided for processing first and second periodic analog signals having the same period and having a fixed phase relationship therebetween. The apparatus includes an A/D converter for converting respective amplitudes of the first and second periodic analog signals into first and second digital signals. The apparatus also includes a phase digitizer for generating a signal from the first periodic analog signal, the generated signal having a period that is shorter than the period of the first periodic analog signal, and a high speed signal processing portion for generating from the generated signal a periodicity and first phase information of the first periodic analog signal. The apparatus further includes a another signal processor for producing second phase information of the first periodic analog signal from the first and second digital signals, and for correcting the periodicity on the basis of the first phase information and the second phase information.

8 Claims, 4 Drawing Sheets

SIGNAL PROCESSING APPARATUS AND DISPLACEMENT DETECTING APPARATUS USING THE SAME

BACKGROUND OF THE INVENTION

1. Field of the Invention

This invention relates to a signal processing apparatus for generating an interpolation signal having a resolution higher than the period of a periodic signal and a position detecting apparatus using the same, and more particularly to a signal interpolation apparatus using sine and cosine wave signals generated in accordance with the displacement by an encoder or the like to obtain a resolution higher than the period thereof, in other words, shorter than the fundamental period. This apparatus can be used in the fields of precise position measurement and precise position control.

2. Related Background Art

Figure 1:
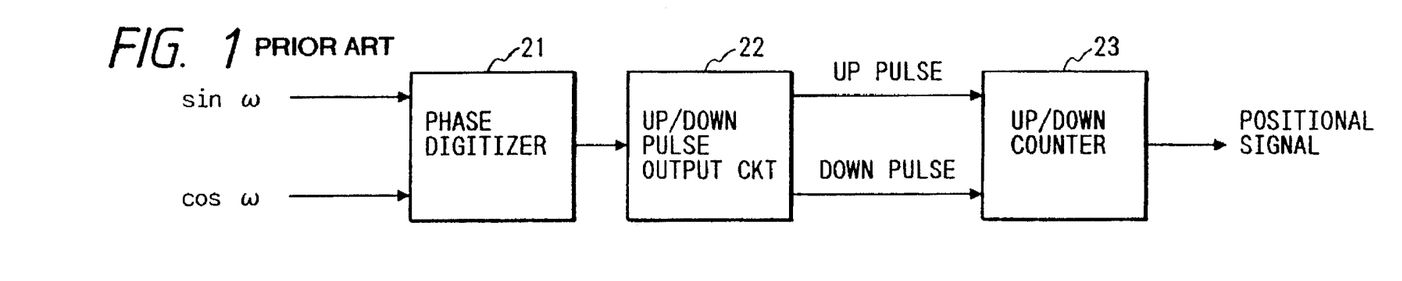
FIG. 1 is an illustration of an example of the prior art.
Figure 2:
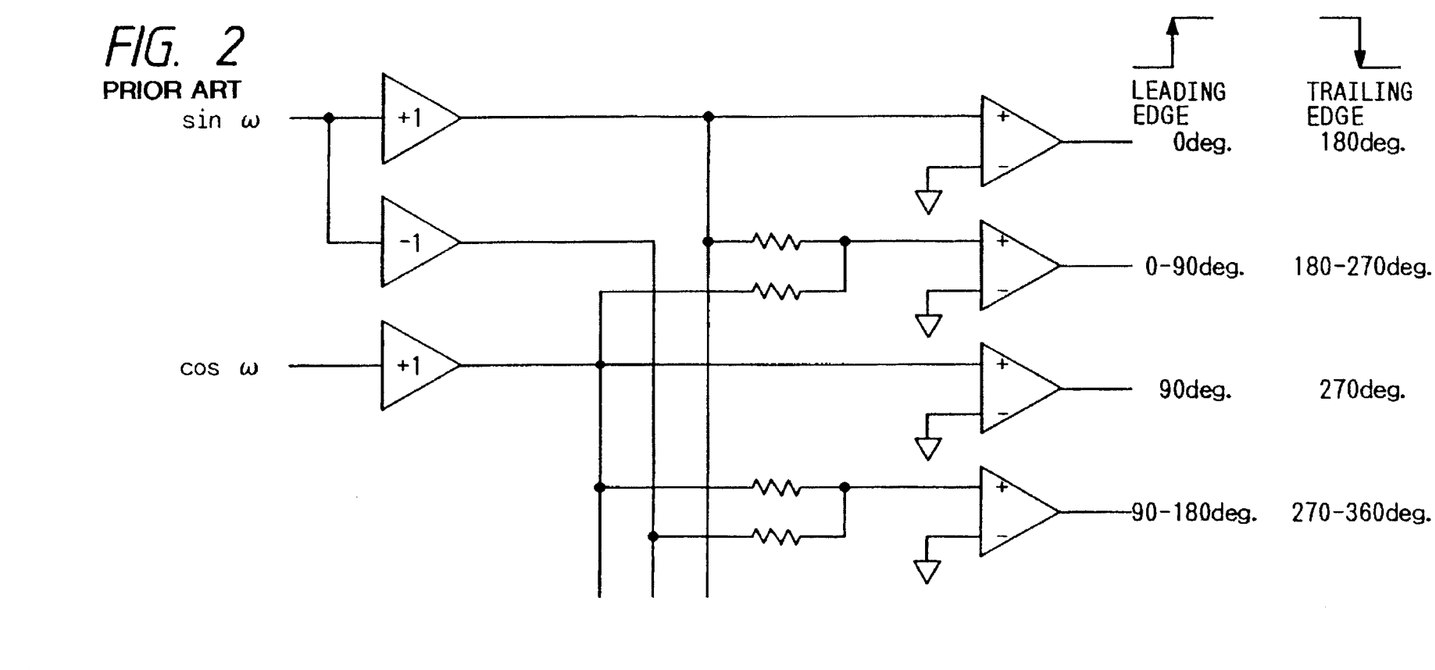
FIG. 2 is an illustration of an example of the prior art.

An example of the conventional art is shown in FIG. 1 of the accompanying drawings. In FIG. 1, sine and cosine wave signals generated in accordance with displacement by an encoder or the like are converted into a rectangular wave having a frequency higher than the fundamental frequency of the sine wave signal by the use of a phase digitizer 21 for quantizing the sine and cosine wave signals in accordance with the phase angles thereof. From this signal, a count up pulse and a count down pulse are produced by an up/down pulse output circuit 22, and these are integrated by an up/down counter circuit 23, whereby a positional signal is outputted. As for the phase digitizer 21, use can be made of one having a construction as shown, for example, in FIG. 2 of the accompanying drawings.

Figure 3:
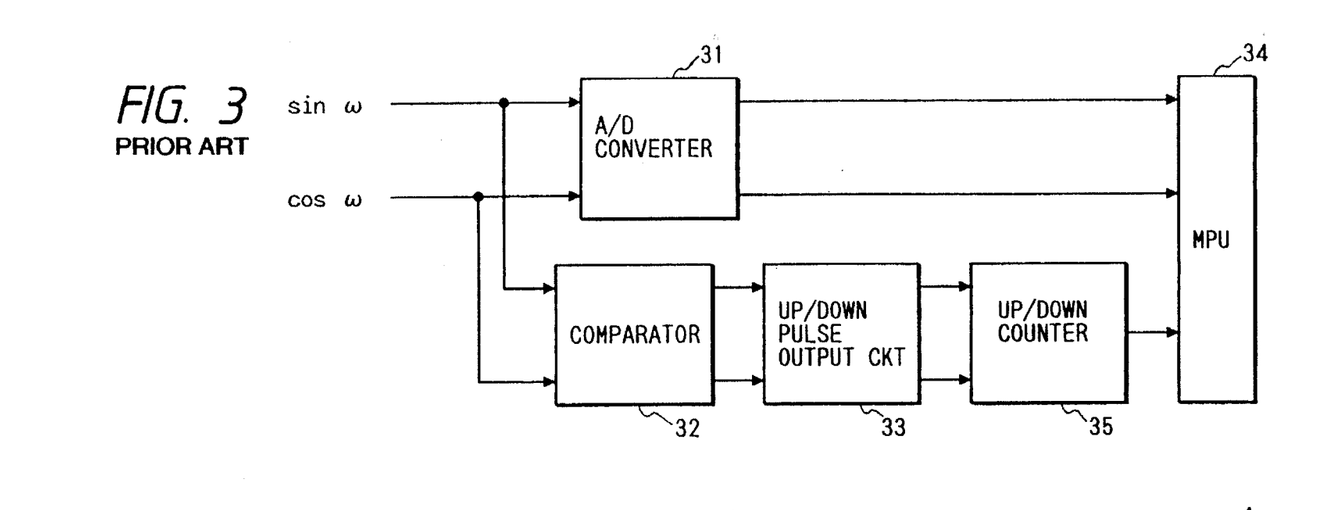
FIG. 3 is an illustration of an example of the prior art.

As another example of the prior art, the construction described in Japanese Laid-Open Patent Application No. 54-19773 is shown in FIG. 3 of the accompanying drawings. In FIG. 3, sine and cosine signals are converted into digital values by an A/D converter 31 and input into a microprocessor 34, wherein the ratio between the values is found and the inverse tangent value thereof is calculated, and an interpolation process for finding the phase angle of the sine wave is carried out. Also, in parallel with this process, the sine and cosine signals are compared with 0 V by a comparator 32 and are thereby converted into a rectangular wave. Thereafter as in FIG. 1, a count up pulse and a count down pulse are produced by an up/down pulse output circuit 33. These are integrated by an up/down counter circuit 35, and the fundamental frequency of the sine wave signal is counted, which is thereby synthesized by a microprocessor 34 to thereby obtain positional information.

In the conventional art shown in FIG. 1, when the interpolation number is great and highly accurate position detection is required the circuit scale of the phase digitizer increases in proportion to the interpolation number. For example, in the construction of FIG. 2, the same number of comparators as the interpolation number becomes necessary and particularly, it is not realistic to digitize to 1/100 or smaller. Even if this problem is solved, the maximum response frequency of the up/down counter in the post stage of the phase digitizer is limited and therefore, it becomes impossible to detect highly accurately the position of an object which is moving at a high speed.

The example of the prior art shown in FIG. 3 intends to solve the above-noted problem to a certain degree, and the interpolation portion and the fundamental frequency counting portion are separated from each other to provide parallel construction, whereby even if the interpolation number is great, the circuit construction can be made small and moreover, the position of an object moving at a high speed can be detected highly accurately.

In the construction of FIG. 3, however, the A/D converting portion and the phase digitizing portion operate in parallel and therefore, their operations must be executed completely in synchronism with each other, and even when only slight shift in time has occurred. There is a possibility that mismatch occurs between positional information obtained from each portion. In such case, there is the possibility that positional information momentarily having a great error is outputted. For example, in a case where a servo system is constructed to use the detected positional information, and a momentarily great disturbance is applied to the servo system, there is a possibility that a fatal problem such as the collision of a moving object. Further, when the sine wave signal has noise, a similar problem arises and it has been impossible to obviate this.

Also, it is ideal that the sine and cosine wave signals obtained from the encoder or the like have equal amplitudes, but their amplitudes often fluctuate depending on position. Particularly when highly accurate detection is necessary, such amplitude fluctuation makes accurate interpolation calculation impossible, for example, in a portion for finding the inverse tangent. Therefore in the aforedescribed example, there is proposed a method of correcting this in a software-like fashion by the microprocessor 34. However, amplitude correction generally involves multiplying and dividing processes and therefore, the load of the microprocessor is high. If the same processor is used for the control calculation of the servo system, this becomes high load overhead and it becomes impossible to secure a short control period. It is possible to prepare a look-up table or the like and curtail the amount of multiplication and division, but in such case, the greater the interpolation number is, the the larger the look-up table, and it becomes difficult to store the table in memory effectively.

SUMMARY OF THE INVENTION

In view of the above-noted disadvantage peculiar to the conventional art, it is an object of the present invention to provide a highly reliable signal processing apparatus, a position detecting apparatus and a driving device which can make a circuit construction small even if the interpolation number is great, and which can detect a periodic signal highly accurately and can further prevent the occurrence of an error resulting from the influences of the mismatch, noise, etc. of information.

It is a further object of the present invention to provide an apparatus which can easily correct any amplitude fluctuation without increasing the load of a processor or the like.

It is still a further object of the present invention to provide an apparatus which can confirm that the operation of a phase digitizer is normal.

One form of the signal processing apparatus of the present invention for achieving the above objects is a signal processing apparatus for processing first and second periodic analog signals having the same period and having a fixed phase relation therebetween, characterized by digitizing means for converting the first and second periodic analog signals into first and second digital signals in conformity with the respective amplitudes thereof, signal generating means responsive to the first and second periodic analog signals to generate a signal having a period shorter than the period of the first periodic analog signal, means for outputting the periodicity of the first periodic analog signal and first phase information of the first periodic analog signal from the signal from the signal generating means and processing means for producing second phase information of the first periodic analog signal from the first and second digital signals from the digitizing means, and correcting the periodicity from the output means on the basis of the first phase information and the second phase information.

A preferred form of the resolution of the first phase information is characterized in that it is lower than that of the second phase information.

A preferred form of said processing means is characterized by means for comparing the first phase information and said second phase information with each other.

A preferred form of said processing means is characterized by means for synthesizing said corrected periodicity and said second phase information.

Further, a preferred form of said signal processing apparatus is characterized by means for adjusting the amplitudes of said first and second periodic analog signals on the basis of said first and second digital signals.

One form of the displacement detecting apparatus of the present invention is an apparatus for detecting the displacement of an object by the use of first and second periodic analog signals generated by the displacement of the object, having the same period and having a fixed phase relation therebetween, characterized by:

digitizing means for converting said first and second periodic analog signals into first and second digital signals in conformity with the respective amplitudes thereof, signal generating means responsive to said first and second periodic analog signals to generate a signal having a period shorter than the period of said first periodic analog signal, means for outputting the periodicity of the first periodic analog signal and first phase information of first periodic analog signal from the signal from the signal generating means and processing means having means for producing second phase information of the first periodic analog signal from the first and second digital signals from the digitizing means, and correcting the periodicity from said output means on the basis of the first phase information and the second phase information, and means for synthesizing said corrected periodicity and the second phase information and outputting the displacement information of an object.

A preferred form of the resolution of the first phase information is characterized in that it is lower than that of the second phase information.

A preferred form of said processing means is characterized by means for comparing said first phase information and the second phase information with each other.

Further, a preferred form of the displacement detecting apparatus is characterized by means for adjusting the amplitudes of the first and second periodic analog signals on the basis of said first and second digital signals.

A preferred form of the processing means is characterized by means for detecting the monotonicity of the first phase information sequentially inputted.

The signal processing apparatus of the present invention and a displacement detecting apparatus using the same will hereinafter be described in detail with respect to some embodiments thereof.

DESCRIPTION OF THE PREFERRED EMBODIMENTS

Figure 4:
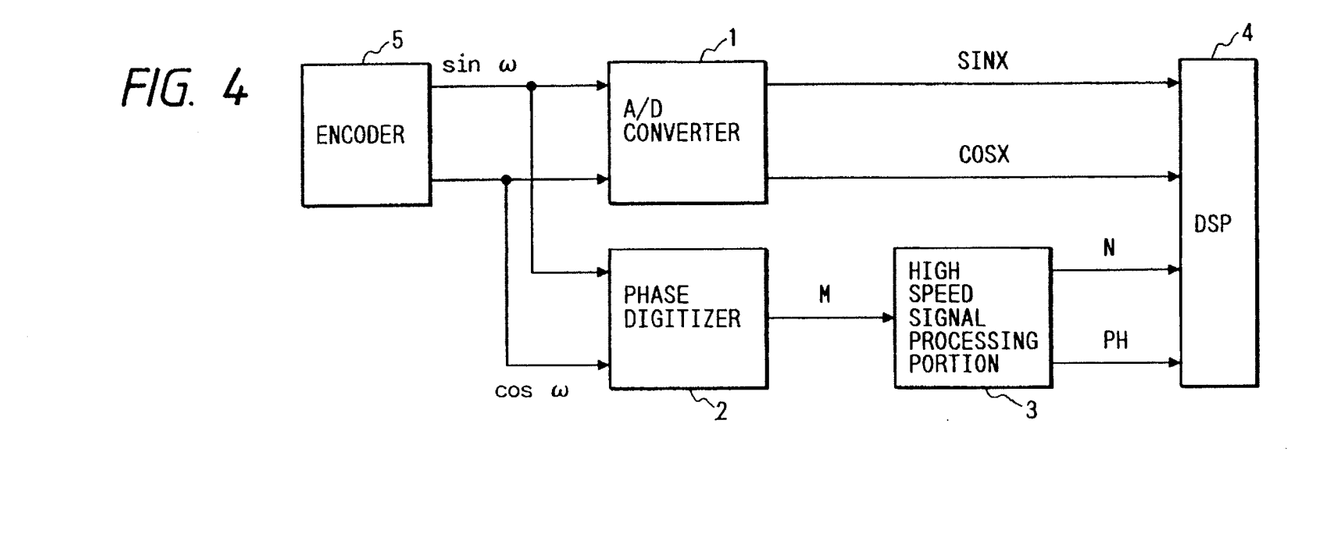
FIG. 4 shows a first embodiment of the present invention.

A first embodiment of the present invention is shown in FIG. 4. In FIG. 4, the reference numeral 1 designates an A/D converter with high resolution for converting into a digital signal an analog signal obtained from an encoder 5 signal varying in a sine and cosine wave fashion in accordance with the displacement of an object. The A/D converter 1 has a resolution of 12 bits, i.e., attaches importance to accuracy and resolution, operates at a relatively low speed and does not respond to an input signal of a high frequency. The reference numeral 2 denotes a phase digitizer which, like the A/D converter 1, receives as inputs sine and cosine wave analog signals obtained from the encoder 5, but operates at a high speed and is of low resolution. The phase digitizer 2 has a resolution of 3 bits, and the period of the output signal thereof is shorter than the period of the signal inputted thereto. The reference numeral 3 designates a high speed signal processing portion which has the output of the phase digitizer 2 as an input and outputs the periodicity N of the sine wave signal, i.e., the number of the fundamental waves of the sine wave, and a logical signal PH which is 1 within a range of 0° to 180° of the phase of the sine wave and is 0 within a range of 180° to 360°. The reference numeral 4 denotes a signal processing portion for receiving the outputs of the A/D converter 1 and the high speed signal processing portion 3 and effecting the signal processing of producing final positional information. A digital signal processor (DSP) is used as the signal processing portion 3 to realize high speed processing. Also, an incremental type encoder is used as the encoder 5 which outputs sine and cosine waves in accordance with position.

The procedure of these operations will hereinafter be described in succession.

The sine and cosine wave signals outputted from the encoder 5 are first inputted to the A/D converter 1 and are outputted as digital values SINX and COSX of 12 bits each. At the same time, these sine and cosine wave signals are inputted to the phase digitizer 2, which outputs digital data M of 3 bits. M is 0 when the phase angle of the sine wave signal is 0 and increases by 1 during each ⅛ of the period of the sine wave signal. That is, 360° of one period is divided into eight phase segments, and phase data is digitized in the order of 0, 1, 2 counter-clockwise from the first quadrant. The high speed signal processing portion 3 receives this output increments N by 1" when M changes from 7 to 0, and ouputs the periodicity N of the obtained sine wave signal. At the same time, it outputs a logical signal PH which becomes 1 when M is 0, 12, or 3 and is 0 when M is 4, 5, 6, or 7.

The portion for counting the periodicity of the fundamental wave generates redundant data N and PH to obviate wrong counting caused by pulse noise or the like as follows.

Figure 5:
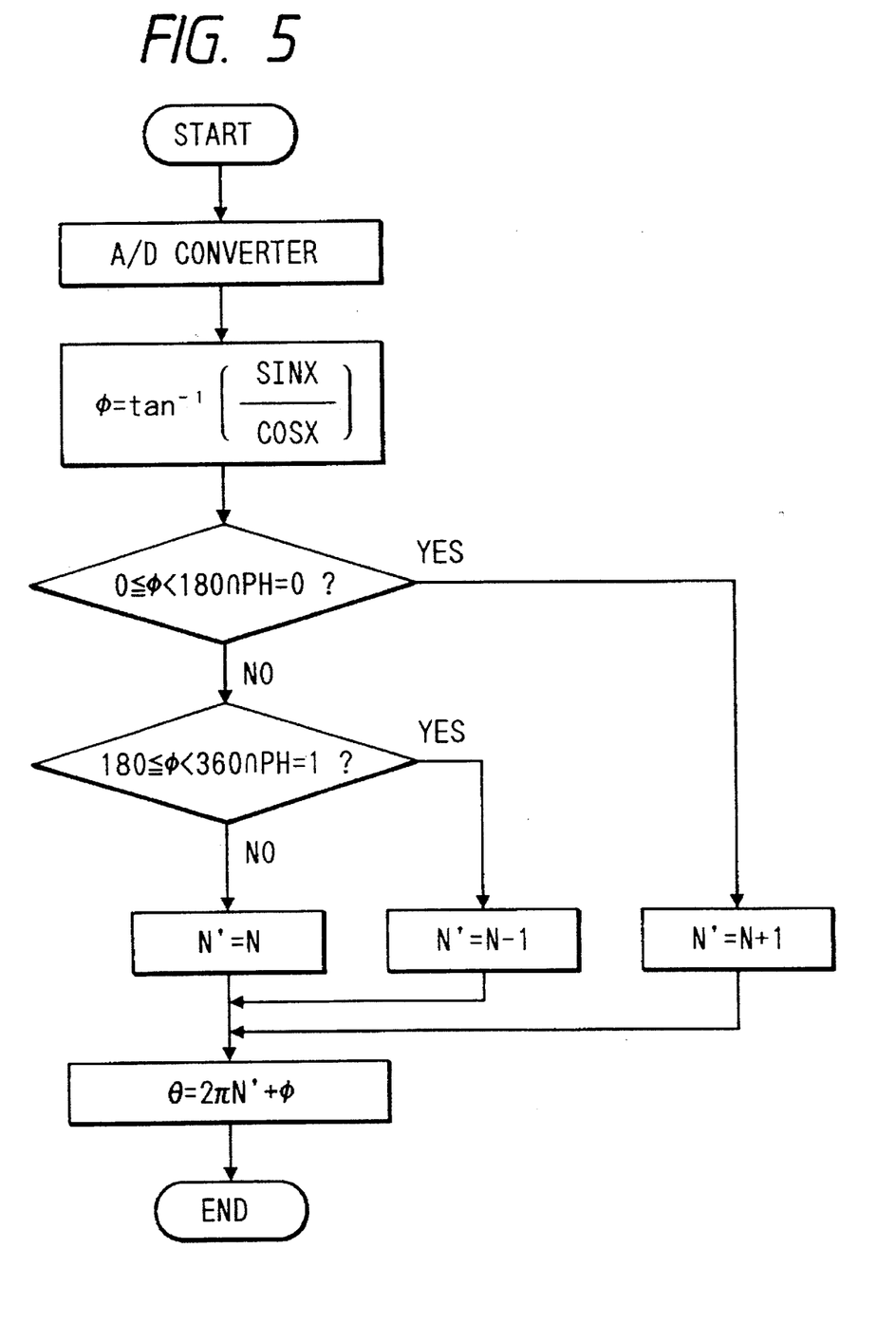
FIG. 5 is a chart illustrating the first embodiment of the present invention.

In the DSP 4, by the use of SINX, COSX, N and PH obtained by the above-described procedure, positional information is produced by a procedure shown in the flow chart of FIG. 5. The phase angle φ of the sine wave signal is first calculated from SINX and COSX. The phase angle is obtained by calculating the ratio of SINX to COSX, and applying that ratio to an inverse tangent look-up table prepared in advance. Next, if φ is computed to be in a range of 0° to 180° and the logical signal PH from the high speed signal processing portion 3 is 0, indicating the phase angle to be between 180° and 360°, DSP 4 determines that a mismatch has occurred between the data obtained from the A/D converter 1 and the data obtained by way of the phase digitizer 2. The phase angle computed from the digital signals output from the A/D converter 1 is always considered to be the correct phase angle. In this case, the value N should have increased by 1, since the sine wave passed through 0° as indicated by the phase angle computed from the digital values output from the A/D converter, but did not because of an error. Accordingly, in order to eliminate this error, a correcting process of increasing N by 1 to provide N'=N+1 is carried out by the DSP 4. If conversely, φ is computed to be in a range of 180° to 360° and the logical signal PH from the high speed signal processing portion 3 is 1, indicating the phase angle to be between 0° and 180°, DSP 4 determines that N has been incorrectly incremented by 1 too many in the high speed signal processing portion, and N is corrected by subtracting by 1 to thereby provide N'=N−1. When these two conditions do not apply, i.e., the phase angle computed from the digital signals of the A/D converter correctly matches PH, there is no mismatch between the data obtained from the A/D converter 1 and the data obtained by way of the phase digitizer 2 and therefore, the correction as described above is not necessary and N'=N. Thereafter, corrected periodicity N; multiplied by 2π and the phase angle φ are added to thereby obtain final positional information.

By providing the correcting means as described above, there can be constructed a highly accurate position detecting apparatus in which the mismatch between the data obtained from the signal processing portions provided in parallel can be prevented to thereby eliminate any momentary detection error and which is stable and moreover can cope with high speed motion.

Figure 6:
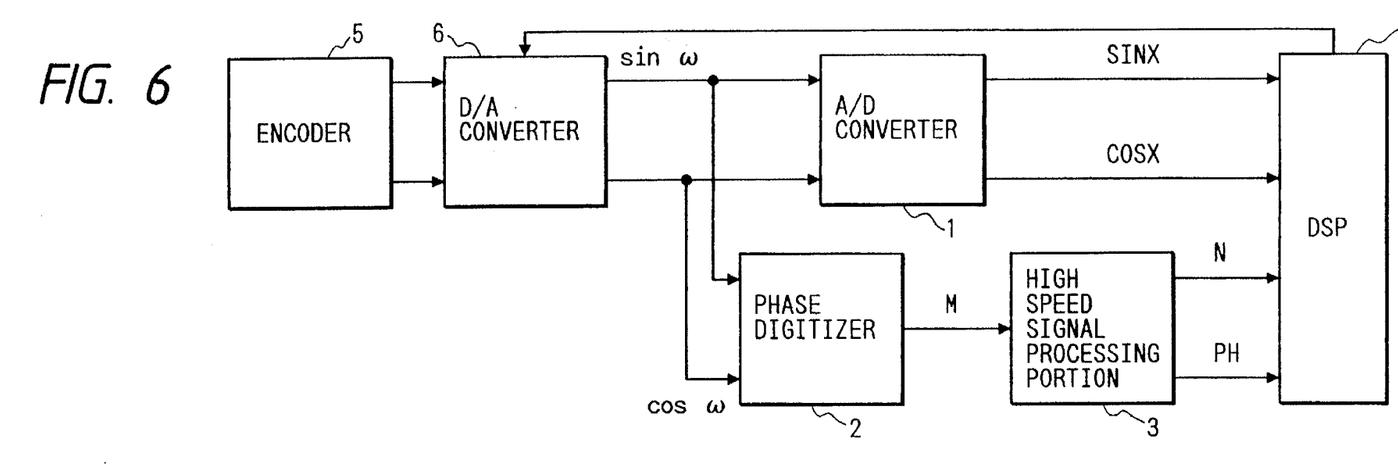
FIG. 6 is a diagram illustrating a second embodiment of the present invention.

A second embodiment of the present invention is shown in FIG. 6. This embodiment is one which a multiplication type D/A converter 6 for correcting the amplitudes of the signals from the encoder 5 is added to the first embodiment shown in FIG. 4.

This embodiment is similar in the basic processing procedure to the first embodiment, but in this embodiment, by the utilization of the fact that the digital data obtained from the A/D converter 1 are always introduced into the DSP 4, the maximum values and minimum values of the A/D converted data SINX and COSX of the sine and cosine wave signals are held within the DSP 4. Further, each time the signals from the encoder 5 are A/D-converted, these maximum values and minimum values are successively renewed to thereby hold optimum maximum and minimum values at all times. The amplitudes of the sine wave and cosine wave signals are then calculated and a correction signal is outputted to the multiplication type D/A converter 6 and applied to the sine wave and cosine wave signals so that they become equal to each other, and thus, the correction of the amplitudes of the signals from the encoder 5 is effected.

By providing such gain correcting means, any error included in the phase angle data φ due to the imbalance of the gain can be eliminated to thereby enhance the linearity thereof particularly when the calculation for finding the inverse tangent shown in the flow chart of FIG. 5 is effected. The signals from the encoder 5 can also be set to the maximum possible amplitudes in the A/D converter 1 and phase digitizer 2 in conformity with their maximum input voltages and therefore, the influence of a quantization error occurring when the signals from the encoder 5 become small can be minimized. When the input voltage widths of the A/D converter 1 and phase digitizer 2 differ from each other, multiplication type D/A converters can be prepared discretely or the signals can be suitably attenuated after they have passed through the D/A converter 6.

Further, a digital filter may be implemented within the DSP 4 and high frequency noise which may be included in the signals from the encoder 5 is attenuated to a sufficiently negligible level by filter calculation. Since the digital filter processing by software is possible, there can be provided a filter having a desired cut-off/phase characteristic, such as an FIR filter of linear phase.

In the above-described embodiment, a phase digitizer of at least 1 bit is used with the portion for counting the periodicity of the fundamental wave to give redundancy, thereby improving resistance to disturbance. Also, provision is made of a variable gain amplifier positively utilizing the phase information obtained in the phase digitizer portion to effect correction or error detection when the information obtained on the interpolation side and the periodicity of the fundamental are synthesized, and further correcting the amplitudes of the sine and for cosine wave signals.

Figure 7:
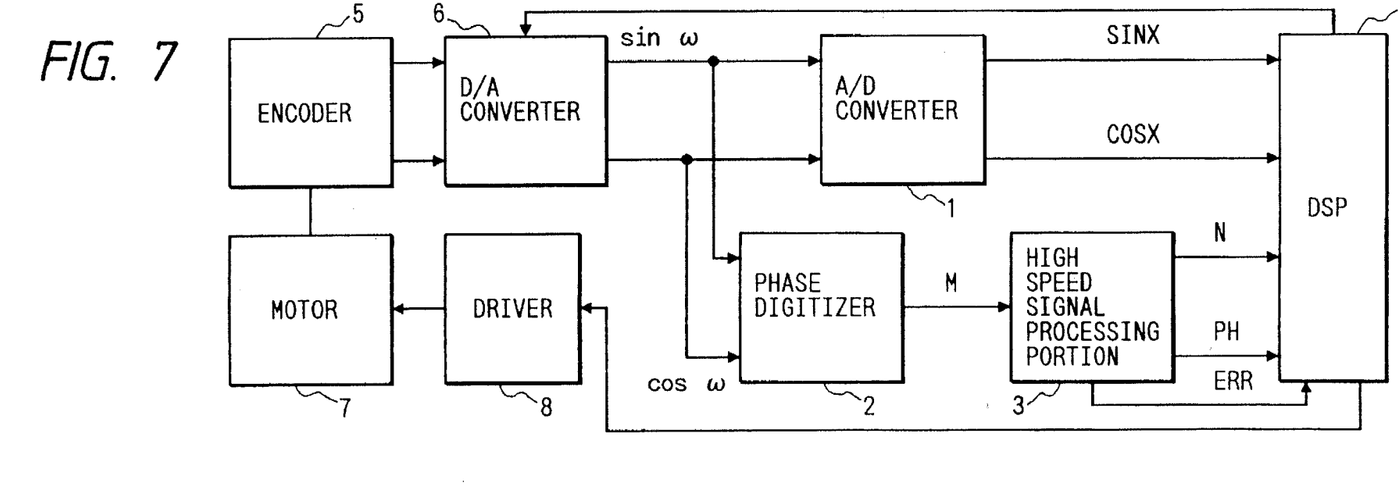
FIG. 7 is a diagram illustrating a third embodiment of the present invention.

As a third embodiment of the present invention, there is shown the construction of FIG. 7 in which an electromagnetic motor 7 and a motor driver 8 are added as an actuator to the construction of FIG. 6 to thereby provide a positioning servo system. The angle of the motor is highly accurately detected by the procedure shown in the above-described embodiment to thereby construct such a control system that this angle coincides with a desired target position. Control calculation constituting an appropriate compensator on the basis of the detected angle data is effected within the DSP 4 and a current reference value to the motor obtained as a result is given to the motor driver 8, whereby the highly accurate positioning of the motor becomes possible.

At this time, the redundancy in the phase angle PH realized by the phase digitizer 2 is utilized more positively. That is, a logical signal ERR is 0 as long as the phase-digitized value M increases by 1 each time interval and which becomes 1 when M varies by 2 or greater in the time interval, that is, when the monotonicity of M becomes null, is generated by the high speed signal processing portion and is introduced into the DSP 4. When the logical signal ERR has become 1, it is judged that some sudden disturbance has been inputted from a mechanical system, and for example, the output current of the driver 8 is rendered 0 to thereby stop the servo operation, thus informing the operator that some abnormality has happened. Thereby, a problem that the servo system is destroyed by an abnormal operation due to a great detection error, disturbance or the like can be obviated, and a highly reliable servo system can be constructed.

The invention may be embodied in other specific forms without departing from the spirit or essential characteristics thereof. The above-described embodiments are thereby to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A signal processing apparatus for processing first and second periodic analog signals having the same period and having a fixed phase relationship therebetween, comprising:

digitizing means for converting respective amplitudes of the first and second periodic analog signals into first and second digital signals;

signal generating means for generating a signal from the first periodic analog signal, the generated signal having an angular resolution that is larger than the angular resolution of the first periodic analog signal;

first processing means for generating, from the signal generated by said signal generating means, a third digital signal representing the periodicity of the first periodic analog signal and a first interpolation signal representing a first interpolation value within a period of the first periodic analog signal; and second processing means for producing a second interpolation signal representing a second interpolation value within a period of the first periodic analog signal from the first and second digital signals from said digitizing means, wherein the first interpolation signal has a angular resolution lower than a angular resolution of the second interpolation signal, and for changing the third digital signal on the basis of the first interpolation signal and the second interpolation signal.

2. The apparatus of claim 1, wherein said second processing means changes the third digital signal by comparing the first interpolation signal with the second interpolation signal.

3. The apparatus of claim 1, wherein said second processing means synthesizes an angular position from the changed third signal and the second interpolation signal.

4. The apparatus of claim 1, further comprising means for adjusting the respective amplitudes of the first and second periodic analog signals on the basis of the first and second digital signals.

5. An apparatus for detecting the displacement of an object by the use of first and second periodic analog signals generated by the displacement of the object and having the same period and having a fixed phase relationship therebetween, comprising:

digitizing means for converting respective amplitudes of the first and second periodic analog signals into first and second digital signals;

signal generating means for generating a signal from the first periodic analog signal, the generated signal having an angular resolution that is larger than the angular resolution of the first periodic analog signal;

first processing means for generating, from the signal generated by said signal generating means, a third digital signal representing the periodicity of the first periodic analog signal and a first interpolation signal representing a interpolation value within a period of the first periodic analog signal; and second processing means for producing a second interpolation signal representing an interpolation value within a period of the first periodic analog signal from the first and second digital signals from said digitizing means, wherein the first interpolation signal has a angular resolution lower than a angular resolution of the second interpolation signal, and for changing the third digital signal on the basis of the first interpolation signal and the second interpolation signal, and for synthesizing the displacement of the object from the changed third digital signal and the second interpolation signal.

6. The apparatus of claim 5, wherein said second processing means changes the third digital signal by comparing the first interpolation signal with the second interpolation signal.

7. The apparatus of claim 5, further comprising means for adjusting the respective amplitudes of the first and second periodic analog signals on the basis of the first and second digital signals.

8. The apparatus of claim 5, wherein said first processing means detects a change of the signal generated by said signal generating means.

* * * * *

UNITED STATES PATENT AND TRADEMARK OFFICE
CERTIFICATE OF CORRECTION

PATENT NO. : 5,625,310

DATED : April 29, 1997

INVENTOR(S) : Hiroaki Takeishi

It is certified that error appears in the above-identified patent and that said Letters Patent is hereby corrected as shown below:

```
ON THE TITLE PAGE, item [57] ABSTRACT
  Line 13, "a" should be deleted.

COLUMN 1
  Line 43, "Thereafter" should read --Thereafter,--;
  Line 47, "thereby" should be deleted;
  Line 48, "thereby" should be deleted;
  Line 52, "required" should read --required,--.

COLUMN 2
  Line 6, "and" should be deleted;
  Line 14, "a possibility that" should read
    --the possibility of--;
  Line 24, "Therefore" should read --Therefore,--;
  Line 30, "becomes high load" should read
    --high load becomes--;
  Line 34, "the the" should read --the--.

COLUMN 4
  Line 14, "signal" (third occurrence) should be deleted;
  Line 54, "output" should read --output M, and-- and
    "1"" should read --1--;
  Line 56, "becomes" should read --is--;
  Line 57, "12," should read --1, 2,--.

COLUMN 5
  Line 28, "N;" should read --N',-- and "2π" should
    read --2π,--
```

UNITED STATES PATENT AND TRADEMARK OFFICE
CERTIFICATE OF CORRECTION

PATENT NO. : 5,625,310

DATED : April 29, 1997

INVENTOR(S) : Hiroaki Takeishi

It is certified that error appears in the above-identified patent and that said Letters Patent is hereby corrected as shown below:

<u>COLUMN 6</u>
  Line 2, "become" should read --are--;
  Line 22, "fundamental" should read --fundamental wave--
    and "further" should read --for further--;
  Line 23, "for" should be deleted.

<u>COLUMN 7</u>
  Line 19, "a" should be deleted (both occurrences).

<u>COLUMN 8</u>
  Line 12, "a" (first occurrence) should read --an--;
  Line 18, "a" should read --an--;
  Line 19, "a" should read --an--.

Signed and Sealed this

Twenty-fifth Day of November, 1997

Attest:

BRUCE LEHMAN

*Attesting Officer*    *Commissioner of Patents and Trademarks*